Nov. 19, 1929.                 H. J. DAVIS                1,736,700
               MACHINE FOR CUTTING OR SHEARING TUBES
                      Filed Feb. 11, 1928        3 Sheets-Sheet 1
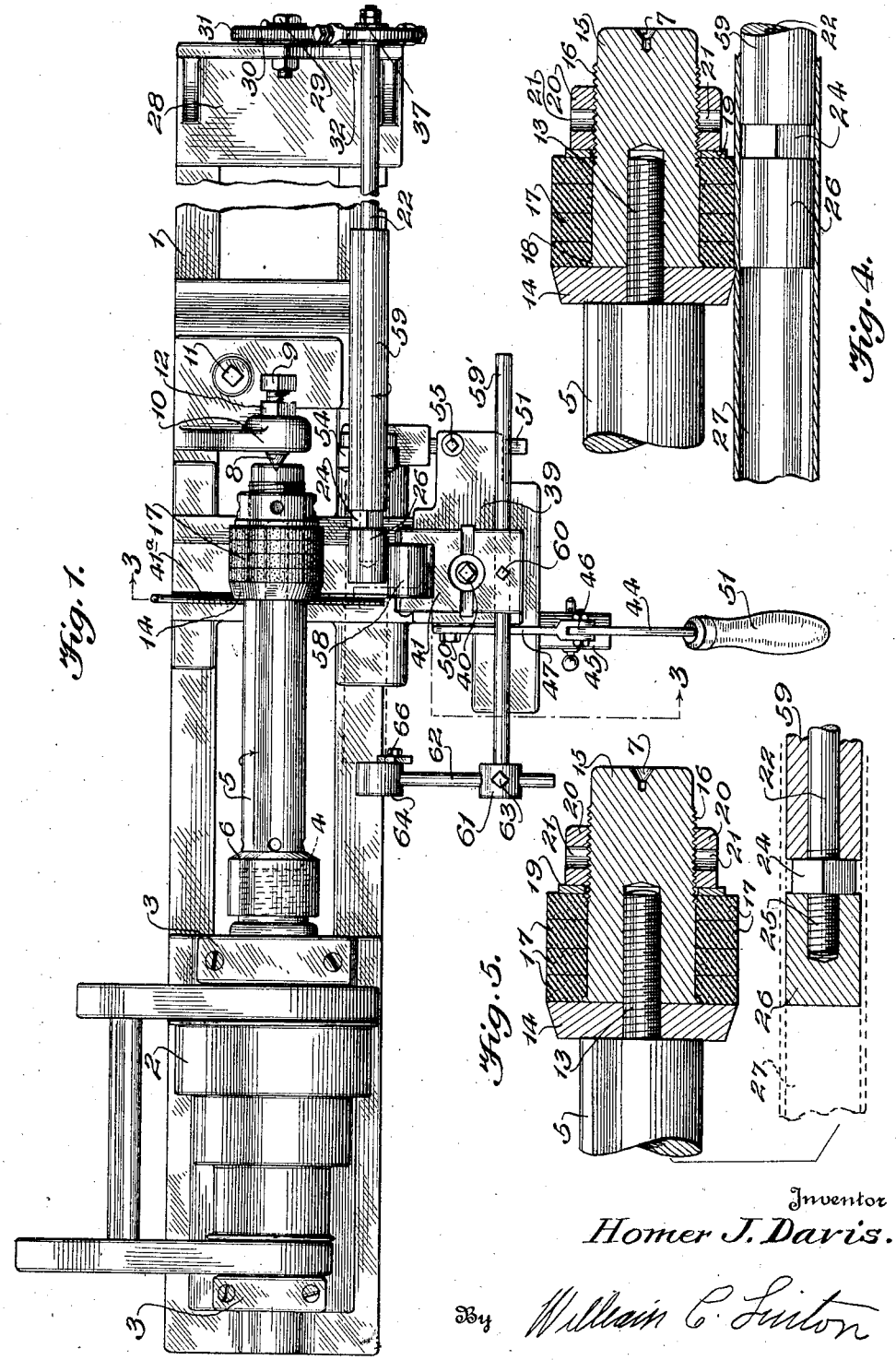
Inventor
Homer J. Davis.
By William C. Linton
Attorney

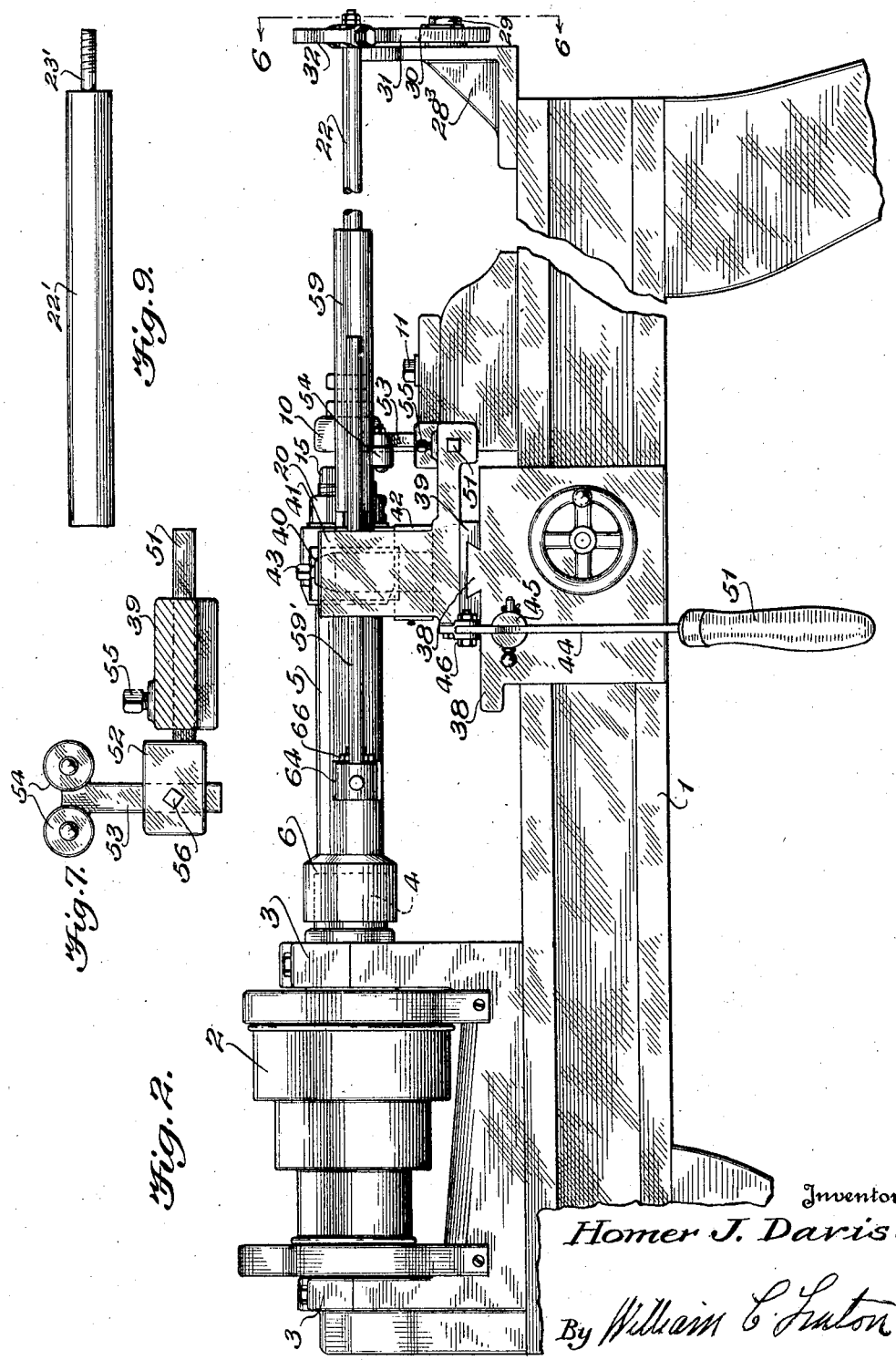

Nov. 19, 1929.  H. J. DAVIS  1,736,700
MACHINE FOR CUTTING OR SHEARING TUBES
Filed Feb. 11, 1928  3 Sheets-Sheet 3
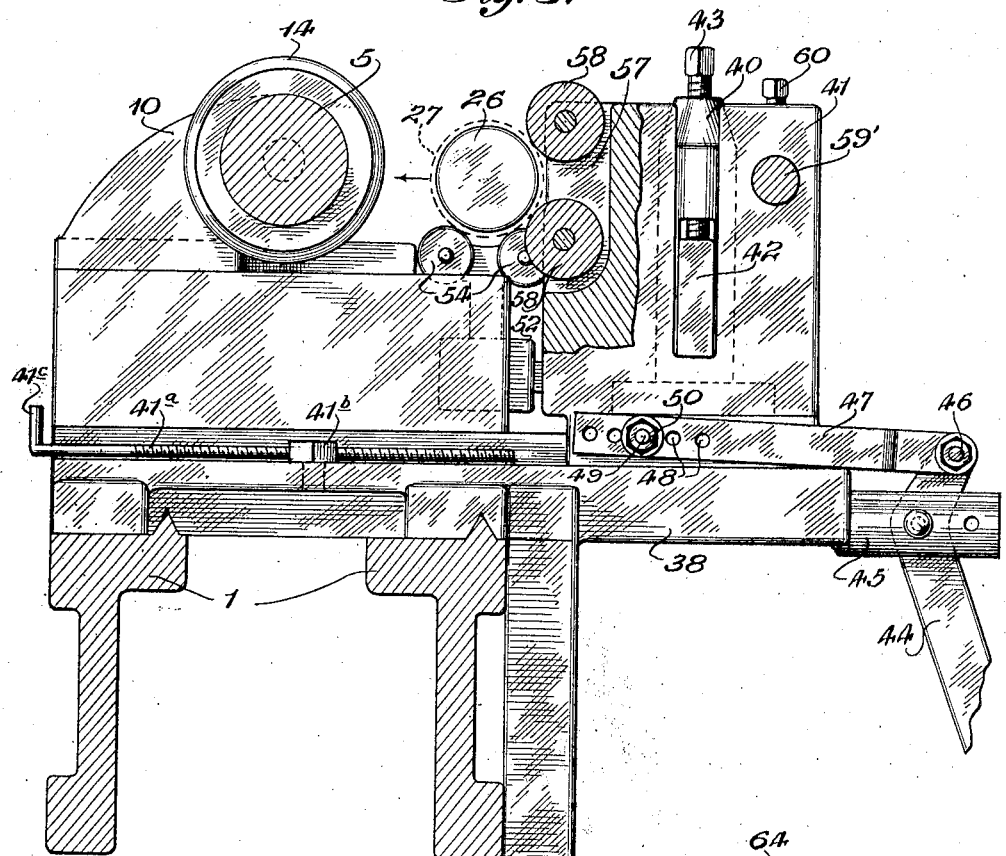
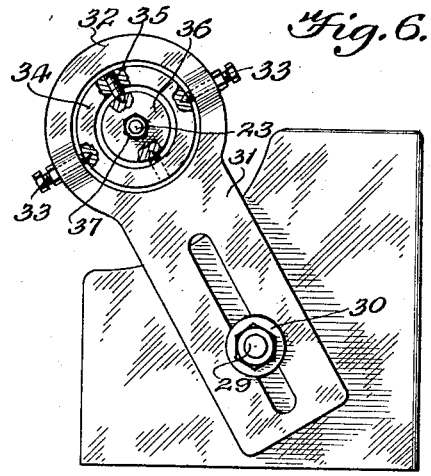
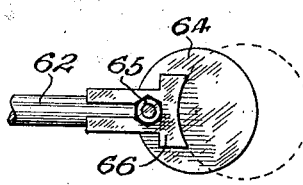
Inventor
Homer J. Davis.
By William C. Fulton
Attorney Patented Nov. 19, 1929

1,736,700

UNITED STATES PATENT OFFICE

HOMER J. DAVIS, OF WILMINGTON, DELAWARE

MACHINE FOR CUTTING OR SHEARING TUBES

Application filed February 11, 1928. Serial No. 253,695.

This invention relates to improvements in machines for cutting or shearing tubes and particularly, tubes of fibre, cardboard, paper, aluminum, brass, copper and similar materials, as well as those formed of bakelite or near bakelite, both molded and laminated, the invention having for an object to provide a machine wherein a novel arrangement and construction of rotary cutters are employed, the same coacting in a manner to permit of the rapid shearing cutting of tubing into predetermined lengths, each of which will be formed with smooth and square ends.

The invention also includes as one of its salient features, the provision of a machine of the character mentioned including a combined rotary cutter and driving means adapted to impart rotary motion to tubing in process of being cut and at the same time, effect a shearing and circumferential cutting of said tubing.

Another of the objects of the invention may be stated to reside in the provision of the machine with a transversely adjustable carriage for supporting a portion of the tubing to be cut and causing the same to be moved into engagement with the rotary cutting disc, whereupon said carriage may be returned to its initial starting position to allow re-adjustment for making ready for the cutting of another length of tubing.

It is also amongst the aims and objects of this invention to provide a universally jointed mandrel for receiving and rotatably supporting a piece of tubing to be cut into lengths or sections, the same removably carrying a cutter head or pilot upon the free end, the outer edge of which is angled and is disposed to transversely coincide with the cutting edge of the rotary cutter disc, whereby with a meeting of the respective edges, the previously adjusted portion of the tubing engaging the carriage will be sheared.

Yet another object of the invention may be stated as being the provision of a carriage for the machine equipped with an adjustable measuring stop adapted to facilitate the cutting of tubing supplied to said machine into predetermined lengths without the necessity of gauging each length by eye, hence, allowing an operator to secure a materially greater production through the full utilization of operating time.

In a prefatory sense, it may be stated that the cutting of tubing into specified lengths has been effected, for the better part or in the major number of instances through the use of band and circular saws of both set and smooth types. This method of cutting, however, is open to numerous manufacturing objections, amongst which there may be mentioned that the ends of sawed tubing lengths are burred or finned to such an extent as to render it necessary to clean each one of the same; also, that in sawing the tubing, both band and circular saws have a marked tendency to draw the same, thereby rendering it exceedingly difficult to form the sawed edges square and consequently, detracting from the commercial value of the products. Furthermore, it is to be appreciated that the character of individual attention required to be given each sawed length of tubing materially reduces quantity production and similarly, because of the double handling of the products, i. e., the sawing and then the cleaning or burring of the sawed ends, the cost of production thereof is materially increased.

By the use of my improved cutting machine, I am enabled to approximately treble the output or production of tubes within a given time, as compared to those methods heretofore prevalent in the art, in that the need for double handling of the cut tubes is eliminated since the machine cuts through the tubing in a manner to leave clean and smooth edges and in its operation, does not require as close attention as that necessary in the sawing of tubing. Additionally, by reason of the positive shearing cutting of the tubing lengths, the cut ends thereof are formed perfectly square, hence, increasing the quality as well as the quantity of its production. In this connection, it may be stated that by actual test, I have ascertained that through corresponding effort for periods of ten hours each, forty five hundred tubes have been sawed in accordance with the methods heretofore prevalent in the art, following which, the ends of such tubing then required smoothing to remove the fins or burrs therefrom, while fifteen thousand completely finished pieces have been produced upon my improved machine, the term "finished pieces" to be interpreted herein as meaning cut lengths of tubing having perfectly square and clean and smooth edges wherein no need for rehandling as by the cleaning or burring of the tube edges is required.

It is also of importance to note at this time that where tubes, and especially tubes formed of fibre, are sawed into lengths, the saws, either band or circular, set or smooth, must be sharpened at least once each day and if the fibre is hard and dense, it is absolutely necessary to sharpen the smooth type of saws, four or five times daily. In comparison, it may be stated that by actual test, approximately two hundred thousand lengths of tubing have been sheared by my improved machine without need for re-sharpening of the cutting elements employed thereby. Because of this, it will be well appreciated by persons skilled in the art that a material saving of time and labor will be effected upon part of a user of the invention expressed more fully hereinafter, hence, rendering a materially greater quantity production capable therefrom.

Other objects of the invention will be in part obvious and in part pointed out hereinafter.

In order that the invention and its mode of operation may be readily understood by those skilled in the art to which it appertains, I have in the accompanying illustrative drawings and in the detailed following description based thereupon, set out one possible embodiment of the invention.

In these drawings:

Figure 1 is a plan view of the improved cutting machine,

Figure 2 is a fragmentary side elevation of the same,

Figure 3 is a vertical transverse section taken on the lines 3—3 looking in the direction in which the arrows point, Figure 4 is an enlarged fragmentary detail, partly in section, showing the shearing cutting engagement effected between the cutting head or pilot of the mandrel and the rotary driving cutting disc, Figure 5 is a similar view wherein the mandrel carrying the cutter head or pilot is in its disengaged or non-cutting position with respect to the rotary driving cutting disc, Figure 6 is a fragmentary end elevation, partly in section, of the machine taken on the line 6—6 of Figure 2 looking in the direction in which the arrows point, showing the universal mounting of the mandrel, Figure 7 is a detail, partly in section, showing the adjustable mounting of the tubing supporting carriage, Figure 8 is an enlarged detail in elevation of the adjustable tubing stop employed in connection with the machine for facilitating adjustment of the tubes to predetermined lengths prior to cutting thereof, and Figure 9 is a detail in elevation of a modified form of mandrel.

Having more particular reference to the drawings, in connection with which like characters of reference will designate corresponding parts throughout, the improved machine may be stated to comprise a bed generally indicated by the numeral 1, similar in its design to an ordinary lathe bed, being equipped with a stepped pulley or head 2 adapted to be driven from suitable motion transmitting mechanism, the head being supported in suitable bearings designated by the numeral 3, while an externally screw threaded nose 4 is extended from the drive shaft for a distance beyond the inner bearing 3, as is shown in the Figures 1 and 2; a shaft assembly 5 provided with an internally screw threaded cupped end 6 being disposed longitudinally of the bed 1 and having the screw threaded nose 4 engaged therein, the opposite or remaining end being formed with a concentrically arranged bearing opening 7 receiving therein a bearing center 8 formed upon one end of a set screw 9 turned into engagement with and through the screw threaded opening of a supporting pillar or casting 10, which, as will be noted, is adjustably fastened or secured to the bed 1 through the medium of a bolt 11; the arrangement of this supporting casting 10 upon the bed 1 being such that it will not interfere with the arrangement of tubing supplied to the machine for cutting. The set screw 9 carrying the bearing center 8 is preferably adapted to be locked in an adjusted position by means of the usual jamb nut 12, hence, preventing relative movement thereof subsequently to proper rotatable mounting or engagement of the center in the bearing opening 7 and also, rendering it possible to remove the shaft assembly and to adjust the same, as when it becomes necessary to sharpen or repair the cutting disc portion thereof, hereinafter more fully described.

The shaft assembly 5 may be stated to comprise the shaft proper having a reduced screw threaded extension or quill 13 formed on that end opposite to the internally screw threaded cupped portion 6, over which there is slidably and snugly engaged a hardened steel rotary cutting knife or disc 14, the peripheral portion of which is beveled as indicated in the Figure 4. With arrangement of the cutting disc 14 upon the quill 13 and bearing against the shoulder formed on the shaft proper by reason of the formation of said quill thereupon, a nipple or bearing extension 15 is turned into engagement with the extension 13 to that extent whereupon it binds on the adjacent face of the cutting disc 14, the outer end of said section having the bearing opening hereinbefore identified by the numeral 7 formed concentrically of its outer end, while external or peripherally disposed screw threads 16 are formed upon a portion of the same. A series of juxtaposed rubber washers 17 are now slidably engaged over the bearing extension 15, as is shown in the Figure 4, a bearing 18 upon the adjacent end of said extension serving to partially limit the extent of engagement of said washers, and more particularly, back up and make solid the rubber washer edge adjoining the metal rotary shearing edge so that said washers will work better and last longer. Following the engagement of the rubber washers 17 over the bearing extension 15, a follow up washer 19 is arranged adjacent the same and over the extension 15 whereupon a round nut 20 is turned into engagement, with the screw threaded portion 16, thereby effecting a clamping assembly of the washers 17 against the adjacent face of the cutting disc 14 and also, immovably positioning said cutting disc 14 upon the extension 13 so that said cutting disc will be caused to rotate with the former; openings 21 being formed in the locking nut 20 whereby to permit of the engagement of a suitable turning implement or other device therewith that it may be effectually turned onto the screw threads 16 aforesaid.

At this point, it is to be noted that the diameters of the rubber washers 17 are approximately the same as the greatest diameter of the cutting disc 14, as is shown in the Figure 4.

With a view toward providing the machine with means for properly supporting tubing to be cut in lengths thereon, I provide a mandrel consisting of a comparatively elongated shaft 22 disposed longitudinally for a portion of the length of the machine bed 1 the outer or far end of said mandrel being formed with a screw threaded extension or shank 23 while the inner or near end of the same has a stop nut 24 turned into engagement with the screw threaded extremity 25 of the same, the outer portion of said screw threaded extremity having a cutter head or pilot formed of hardened steel and indicated herein by the numeral 26, turned into engagement therewith, said cutter head 26 being substantially cylindrical in formation and of a size or diameter which will permit of its snug engagement in the tubing 27 to be cut thereby. At this point, it is to be noted that the arrangement of the cutter head or pilot 26 upon the extension 25 is such that it may be removed and replaced by a cutter head of either greater or lesser dimensions, this being entirely dependent upon the diameter or size of the particular tubing 27 to be cut upon the machine.

The arrangement of the outer end of the pilot or cutting head 26 is such that the same approximately coincides with the cutting edge of the disc 14, so that with movement of said pilot 26 toward the disc 14, a shearing like engagement as is indicated in the Figure 4 will be effected.

To permit of movement of the mandrel toward and from the cutting disc 14 and its adjustment or movement to positions for engaging or removing lengths of tubing to be cut, thereon or therefrom, I secure a casting or supporting bracket 28 to one end of the machine bed 1, passing a locking or connecting bolt 29 through an opening formed therein, and engaging a suitable locking nut and washer 30 therewith. The extended end of the bolt 29 is passed through a slot formed longitudinally of the shank portion 31 of a circular bearing ring 32 having diametrically opposed adjustable bearing screws 33 engaged therewith and adapted to pivotally support therebetween a second bearing ring 34, which in turn is provided with diametrically opposed adjustable bearing screws 35, arranged at substantially right angles to the bearing screws 33 whereby to pivotally engage with diametrical bearing pockets or openings formed in a collar 36 engaged over the reduced and screw threaded shank extension 23 of the mandrel 22, whereupon a locking nut 37 is engaged with said extension and in this way, said mandrel 22 is universally mounted or jointed upon the machine bed and therefore, is capable not only of rotating, but of pivotal movement in any direction so as to facilitate not only the movement of the cutter head or pilot 26 to and from the disc 14 but also, to facilitate the proper arrangement or adjustment of tubing upon said mandrel or its removal therefrom.

Mounted transversely of the intermediate portion of the machine bed 1 is a sub-bed 38 formed on its upper side with a longitudinally extending dove-tailed formation 38' which in turn, slidably receives a carriage 39 thereupon, said carriage being adjustable or slidable transversely of the machine bed 1, as is shown in the Figure 1 and carrying thereupon a vertically disposed spindle 40 over which a casting indicated in its entirety at this time by the numeral 41 is engaged, said casting being formed with an opening for receiving the spindle 40 therethrough, as is shown in the Figures 1 and 3, and being adapted to be removably locked or secured to the spindle and to the carriage 39 by passing a locking bar or piece 42 through a diametrical slot formed in the spindle 40 and allowing the opposite extremities of said piece to have bearing or engagement with portions of said casting 41 so that with the downward turning of a locking set screw 43, a binding and locking connection will be effected as between said casting 41 and the carriage 39.

Transversal movement is adapted to be imparted to the carriage 39 and consequently thereupon, to the casting 41, through the medium of a lever 44 pivoted upon an adjustable bearing bracket 45 secured to a portion of the sub-bed 38; one end of said lever being formed with a bell crank-like extension which in turn is pivotally connected as at 46 to a link 47 having a series of openings 48 in the free end thereof, one of which is adapted to be engaged over a screw threaded extension 49 upon said carriage 39 and locked in such engagement through the medium of a nut or other suitable securing device 50; a handle 51 being arranged upon the free or remaining end of the lever 44 for obvious purposes. Thus, it will be understood that by rocking the lever 44, a transversal sliding movement will be imparted to the carriage 39 and consequently, to the casting 41 carried thereupon. The extent or limits of this transversal sliding movement, may of course, be varied or adjusted, by engaging the extension 49 in any one of the different openings 48 in the link 47.

Whereas the adjustment of the extension 49 in the openings 48 of the link 47 will serve as a means for limiting the transversal sliding movement of the casting 41, I also provide as a further transversal motion limiting means or positive stop, a transversely disposed screw threaded rod disposed over the bed 1, designated by the numeral 41$^a$, securing said rod in position through the medium of a cap screw 41$^b$ and having the head thereof tapped out to allow said rod to be turned therethrough; the outer or normally far end of the rod carrying an L-shaped stop finger 41$^c$ against which the casting 41 is adapted to have abutting engagement and thus, bring about a limited transversal movement of the same according to the positioning or adjustment of said rod 41$^a$ in the cap screw 41$^b$ secured in the machine bed.

That the approximately horizontally arranged mandrel 22 having a fibre tubing engaged thereover may be rotatably supported with respect to the casting 41, a cross sectionally square shank 51 is slidably and snugly engaged in an opening formed in one side or extension of the casting 41 and carries a bracket 52 thereon which bracket, in turn, is formed with a cross sectionally square vertical opening adapted to receive a correspondingly formed or shaped shank 53 therethrough, the upper end of said shank having branch extensions formed upon the same whereby to receive bearings for rotatably supporting rollers 54 arranged, as is shown in the Figures 1, 2 and 7, in horizontal planes; the shank 51 being adapted to be secured in adjusted position with respect to the extension of the casting 41 by means of a locking screw 55 turned into engagement with said extension while the shank 53 is adapted to be secured in its particularly vertically adjusted position with respect to the bracket 52 by means of another locking screw 56 turned into engagement with said bracket, as is shown in the Figure 7. Thus as illustrated in the Figure 1, a rotatable support for retaining the mandrel 22 in its substantially horizontal position will be provided.

As a means for imparting lateral movement to the mandrel 22 and to the pilot or cutting head 26 carried thereby, I form a pocket or recess 57 in one side of the casting 41, rotatably mounting therein in relatively vertical spaced relation and horizontal planes, a pair of rollers 58, the positioning of which is such that with transversal inward movement of the carriage 39 and the casting 41, they will serve to engage therebetween the free end of the mandrel 22 and the cutter head 26 carried thereupon so that with additional or continued inward movement, said cutter head and the free end of the mandrel will be moved in a direction toward the cutting disc 14, to that position as shown in the Figure 4.

A measuring stop is preferably provided the casting 41, serving as an effectual means for limiting the longitudinal and outward adjustment or movement of a tube in process of cutting upon the mandrel 22, said stop consisting of a rod 59' slidably engaged in an opening formed transversely of the casting 41 and held in adjusted position through the medium of a set or locking screw 60; the inner end of the rod having a head 61 fixedly connected thereto and formed with a diametrically disposed opening for slidably receiving a second rod 62 at substantially right angles to the supporting rod 59', said second and right angularly disposed rod being secured in an adjusted position with respect to the head 61, through the medium of a locking or set screw 63. Upon the inner end of the rod 62 I fixedly mount a disc-like head 64, passing a supporting bolt 65 therethrough and engaging over said bolt, the bifurcated portion of a gauge device 66, so that with tightening of the locking nut of the bolt 65, said gauge will be securely held in an adjusted position. Obviously, by adjustment of the rod 59' longitudinally of the machine bed 1, the length of stock to be cut from tubing arranged upon the mandrel 22 may be effectually regulated, inasmuch as the outer end of said stock will have abutting engagement with the disc 64 disposed in its path of longitudinal travel, as is shown in the Figure 1, while the gauge 66 may be adjusted upon the bolt 65 to that nicety as will insure retention of the stock or tubing in process of cutting in proper position for positive engagement with the cutting disc 14 upon transverse sliding movement of the carriage 39 and the casting 41.

I have found it desirable, in operation of my improved cutting machine, to effect a comparative snug engagement of the tubing stock to be cut, over the mandrel 22 and to this end, engage a fiber sleeve or similar device 59 over a portion thereof; it being of course understood that the outside diameter of this sleeve 59 approximately corresponds to the inside diameter of tubing to be received over the mandrel 22 so that a comparatively snug slidable engagement will be effected and the tubing will be prevented from having excessive vibratory or similar objectionable movement during a cutting operation.

In operation of the improved machine, a sleeve 59 of diameter approximately corresponding to the inside diameter of the tubing to be cut thereupon is engaged with the mandrel 22, the tubing measuring stops 64 and 65, properly adjusted so as to "measure off" tubing at the proper length with outward sliding of such tubing from the mandrel 22 over the cutter head 26 into that position as is shown in dotted lines in the Figure 1, and rotary movement is transmitted from the head 2 to the shaft assembly 5, causing the cutting disc 14 to be rapidly rotated. With the tubing adjusted to proper cutting position, it will be understood that a portion of the same will have rotatable support upon the pair of horizontally positioned rolls 54 which have been previously adjusted to proper vertical position so that with transversal movement of the carriage 39 and the casting 41, the tubing will be brought into engagement with the cutting edge of the disc 14. To effect cutting of the tubing, the handle 51 of the lever 44 is grasped whereupon said lever is rocked in a direction to transmit transversal sliding movement to the carriage 39 and the casting 41, thereby bringing the vertically positioned pair of rollers 58 into engagement with an adjacent portion of the tubing upon the mandrel 22, hence, moving said tubing inwardly or in a direction toward the cutting disc 14. Thus, it will be seen that the tubing 27 will be moved from that position as is shown in the Figure 5 at the start of a cutting operation until it reaches that point as is shown in the Figure 4, whereupon the cutting edges of the disc 14 and the head 26 will be brought into a shearing like engagement, thereby effecting a shearing cutting of the tubing at a point adjacent to the squared outer edge of the cutting head 26. By reason of the arrangement of the rubber or elastic or cushion washers 17 upon the section 15, it will be understood that with movement of the cutter head into engagement therewith under urge of the vertically arranged rollers 58 carried upon the casting 41 mounted on the carriage 39, said washers will be permitted to compress to that position as is shown in the Figure 4, thereby allowing for the shearing like cutting action as between the meeting or adjacent edges of the cutting disc 14 and the cutter head 26. Subsequently to the cutting of a length of tubing from the stock arranged upon the mandrel 22, the lever 14 is rocked in a reverse direction to return the carriage 39, the casting 41 and the rollers 58 to their initial starting positions whereupon the mandrel with said stock of tubing will be returned to that position as is indicated in the Figure 5, it being borne in mind that the tubing and the mandrel rest upon the horizontally positioned pair of rollers 54. At this time, the tubing is engaged by the operator and is thrust longitudinally and outwardly from the mandrel until the outer or free end thereof comes into abutting engagement with the measuring stop 64 whereupon the method of effecting a shearing cutting of the projected length of tube by the cutting disc 14 and the cutting head 26 is repeated. When the stock upon the mandrel has been depleted, a new length of stock or tubing is engaged thereover by swinging the mandrel 22 upwardly or to such other position by reason of its universal joint or mounting, hereinbefore described, as will facilitate the convenient telescopic engagement of the new tubing stock thereover. At this time, the tubing stock is again adjusted with respect to the measuring stop so as to project the desired length from the mandrel 22 whereupon the shearing cutting operation is effected by the machine.

As hereinbefore described, tubing of different diameters may be cut upon my improved machine and in such instances, it of course will be understood that the cutter head 26 shown in the present embodiment of the invention would be replaced by a similar but larger or smaller cutter head, dependent upon the dimension of the stock to be cut. But, when a large variety of sizes of tubing or stock are to be cut in small quantities at a time, it has been found practical to have a complement of different size mandrels and instead of changing the pilot 26 and the sleeve 59 every time that a different diameter of mandrel is desired, one and a particularly chosen mandrel is substituted. Furthermore, for some small sizes of tubing, it will be more suitable to provide a complement of plain solid mandrels of uniform diameters throughout their respective lengths having cutting edges formed upon their working ends by case hardening or otherwise treating that portion of the metal, this type of mandrel being substituted in lieu of the mandrel 22 with its removable pilot head 26 and sleeve 59, such as indicated by the numeral 22' in the Figure 9; the normally outer end of said mandrel 22' being reduced and provided with a screw threaded shank portion 23' whereby to permit of its engagement with that type of universal mounting shown in the Figure 6.

Manifestly, the construction shown is capable of considerable modification and such modification as is within the scope of my claims, I consider within the spirit of my invention.

I claim:

1. In a tube cutting machine, a rotary cutting means, motion transmitting means carried adjacent said cutting means and rotatable therewith, a rotary mandrel, a cutting head removably engaged with one end of said mandrel cooperable with said cutting means and adapted to have connection with and to be driven by said driving means, and means for moving said cutting head and mandrel towards and from said cutting means and driving means.

2. In a tube cutting machine, a shaft assembly, a cutting disc removably mounted upon said assembly and rotatable therewith, frictional driving means mounted on said assembly adjacent said disc and rotatable with the same, a pivotally mounted rotatable mandrel normally disposed in substantially parallelism to said shaft assembly, a cutting head detachably carried on one end of said mandrel, adapted to have shearing engagement with said disc, and means for rotatably supporting said cutting head and mandrel and moving the same toward and from said disc and said driving means.

3. In a tube cutting machine, a shaft assembly including a removably mounted rotatable cutting disc, yieldable frictional driving means mounted on said shaft assembly adjacent said disc and rotatable therewith, the diameter of said last mentioned means approximately corresponding with the diameter of said disc, a universally jointed rotary mandrel normally disposed in substantially parallelism to said shaft assembly, a detachable cutter head carried on one end of said mandrel, adapted to have shearing engagement with the cutting edge of said disc, a transversely slidable carriage, supporting means on said carriage, horizontally positioned rollers adjustably supported upon said carriage for receiving and rotatably supporting a portion of said mandrel thereupon, vertically arranged rollers carried upon said supporting means adapted to have engagement, at times, with said cutting head and a portion of tubing arranged over the same for moving said cutting head into shearing cutting engagement with said disc, and means for imparting transverse sliding movement to said carriage.

4. In a tube cutting machine, a shaft assembly including a removably mounted cutting disc rotatable therewith, cushion frictional driving means rotatably mounted adjacent said disc and having a diameter approximately corresponding to the diameter of said disc, a universally jointed mandrel normally arranged in substantially parallelism to said shaft assembly, a cutter head detachably engaged with one end of said mandrel, said cutter head being adapted to have shearing engagement with the cutting edge of said disc and to have frictional driving engagement with said cushion means, a transversely slidable carriage, adjustable horizontal supporting rollers on said carriage for receiving and rotatably supporting a portion of the mandrel thereupon, other relatively horizontally arranged rollers on the carriage adapted to have engagement, at times, with said cutter head whereby to move the same into shearing cutting engagement with said cutting disc and into frictional driving engagement with said cushion means, an adjustable measuring stop arranged upon said carriage and disposed in longitudinal alignment with said mandrel during normal positioning of the same, and means for imparting sliding movement to said carriage.

5. In a tube cutting machine, a combined rotary cutting and driving means, a rotatable mandrel, a cutting means on said mandrel cooperable with said first cutting means, a carriage mounted for transverse sliding movement with respect to said mandrel and cutting means, and means on said carriage for rotatably supporting the adjacent portion of said mandrel and for forcing the same into contact with said driving means upon transverse movement of said carriage.

6. In a tube cutting machine, a combined rotary cutting and driving means, a pivotally mounted rotatable mandrel, a cutting means on the free end of said mandrel cooperable with said first cutting means, a transversely slidable carriage, and rollers carried upon said carriage, certain of said rollers being so arranged as to receive and rotatably support a portion of said mandrel thereupon and others of said rollers being arranged to have rotatable contact with an adjacent portion of the mandrel and to maintan the same in contact with said driving means upon movement of the carriage.

In witness whereof I have hereunto set my hand.

HOMER J. DAVIS.